Jan. 19, 1960    R. E. HOULE    2,921,757
LONG RANGE AUTOMATIC NAVIGATOR DEVICE
Filed June 26, 1948    4 Sheets-Sheet 1

INVENTOR.
ROBERT E. HOULE
BY
ATTORNEY.

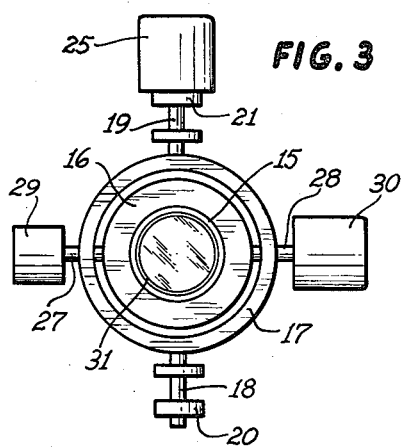
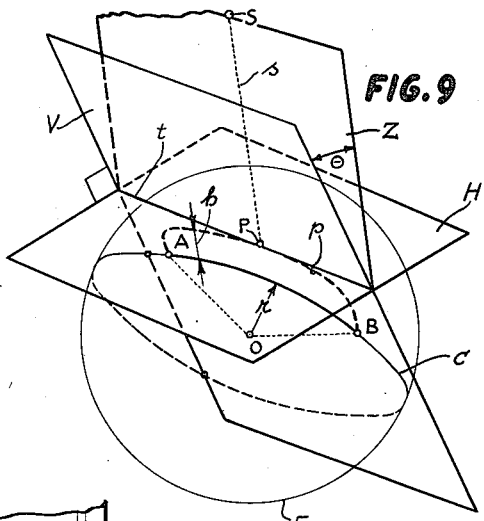
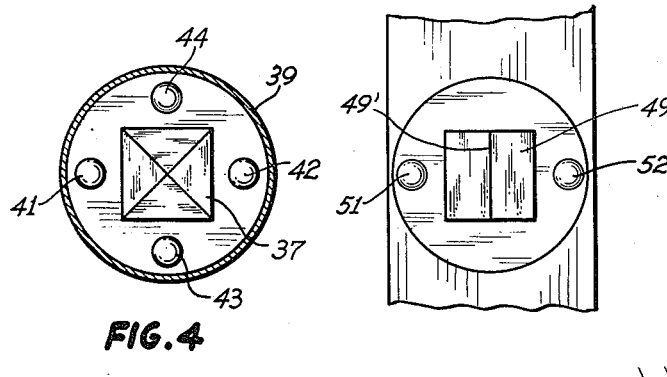
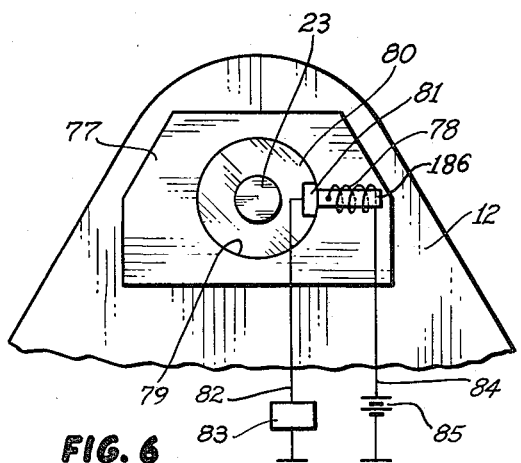
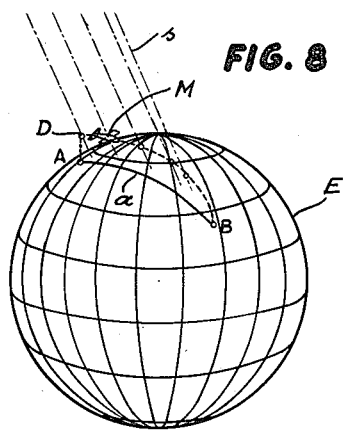

Jan. 19, 1960 R. E. HOULE 2,921,757
LONG RANGE AUTOMATIC NAVIGATOR DEVICE
Filed June 26, 1948 4 Sheets-Sheet 4

INVENTOR.
ROBERT E. HOULE
BY
ATTORNEY.

United States Patent Office 2,921,757
Patented Jan. 19, 1960

2,921,757

LONG RANGE AUTOMATIC NAVIGATOR DEVICE

Robert E. Houle, Willimantic, Conn., assignor to General Scientific Projects, Inc., Hartford, Conn., a corporation of Connecticut Application June 26, 1948, Serial No. 35,497

16 Claims. (Cl. 244—14)

The present invention relates to long-range navigation devices, and, more particularly, to navigation devices adapted to be installed in aircraft or guided missiles such as, for example, unmanned rocket planes designed to carry mail or freight between two predetermined points on the surface of the globe.

An object of the present invention is to provide a navigation device which will guide a missile over a predetermined course independently of beams or other signals transmitted from the ground.

Another object of the invention is to provide a navigation device which will automatically correct deviations from a predetermined course with the aid of celestial fixes.

A further object of the invention is to provide novel and dependable means for controlling the direction and/or speed of travel of a missile or craft so that the latter will follow a precalculated route without substantial aberrations.

Still another object of the invention is to provide, in a missile or craft of the character described, a navigation device which will be inoperative during take-off but will take over control as soon as the missile reaches a predetermined altitude and/or position.

Yet a further object of this invention is to provide a long-range navigation device which need not be oriented by independent means, as by being supported on a gyro-stabilized platform within the craft.

A still further object of my invention is to provide, in a missile or craft, means including a stellar compass for automatically keeping the missile on its course.

In prior navigation devices, stellar or solar compasses have been used occasionally for the purpose of determining instantaneous longitude and latitude and giving corresponding indications to the pilot. Such known devices are obviously inoperative in the case of unmanned or, at least, unpiloted missiles or vehicles, and the navigation device according to the invention therefore includes means for deriving from a stellar compass control signals which will automatically compensate for deviations of the missile or vehicle from its course. It should be noted that the term "stellar compass" is used in its broadest sense and includes any instrument adapted to orient itself according to the position of any celestial body such as a star or the sun.

According to one aspect of the invention, there is provided a method of navigating a guided (as distinct from piloted) craft by means of a stellar compass and a robot or slave circuit adapted to orient the craft in accordance with a simulated track or course, said method comprising the steps of selecting a celestial body, plotting a simulated track as a function of time and of the precalculated direction of the celestial body on each "fix" or reference point of the desired route, training the stellar compass upon the selected celestial body, and linking said compass with said track so that the compass will continuously realign said track relative to said robot in accordance with the instantaneous position of the celestial body relative to the craft.

The robot or slave circuit referred to may be controlled from a continuously movable grid or the like which represents the simulated track and determines the orientation of the craft by means of a track follower which may comprise an optical scanning system. The speed at which the simulated track is fed to the follower system will be a function of the precalculated speed of the craft so that, except for short runs, it will usually be desirable to maintain the latter speed close to its calculated value or else correct for deviations from said value.

According to a further feature of the invention, such correction may be effected by means of an air speed indicator, of any known or suitable design, which is coupled to the mechanism for synchronizing the track with the speed of the craft.

According to still another feature of the invention, the speed of the craft may itself be controlled by means of a stellar compass and a robot circuit which is responsive to a simulated track moving at a given (preferably constant) speed, this latter track being also plotted with reference to time and the instantaneous direction of some suitably chosen celestial body.

Although the invention is applicable to vehicles moving along the surface of the earth, either on land or on water, as well as under the sea, it is believed to be especially useful in connection with aircraft traveling at great distances (for example, of the order of 100 miles) above the ground. In such a case, the precalculated course will preferably lie for its major part on a great circle of a sphere of radius $r+h$ wherein $r$ is the radius of the earth and $h$ is the height of the missile above ground. The navigation device according to the invention will then indicate any deviations from a predetermined azimuth, resulting in a suitable compensatory movement in yaw, while the required distance above ground may be obtained by means known per se (such as a radar system).

Where a missile is launched vertically and changes to level flight upon reaching a predetermined height, the navigator according to the invention is preferably arranged to remain inoperative during launching and to be placed in operative condition upon the missile reaching the drop-off point in its trajectory, such being accomplished, for instance, under the control of a conventional accelerometer or by other suitable means, subsequently described.

The above and other objects and features of the invention will become more clearly apparent from the following detailed description of an embodiment thereof, reference being had to the accompanying drawing in which.

Figure 1:
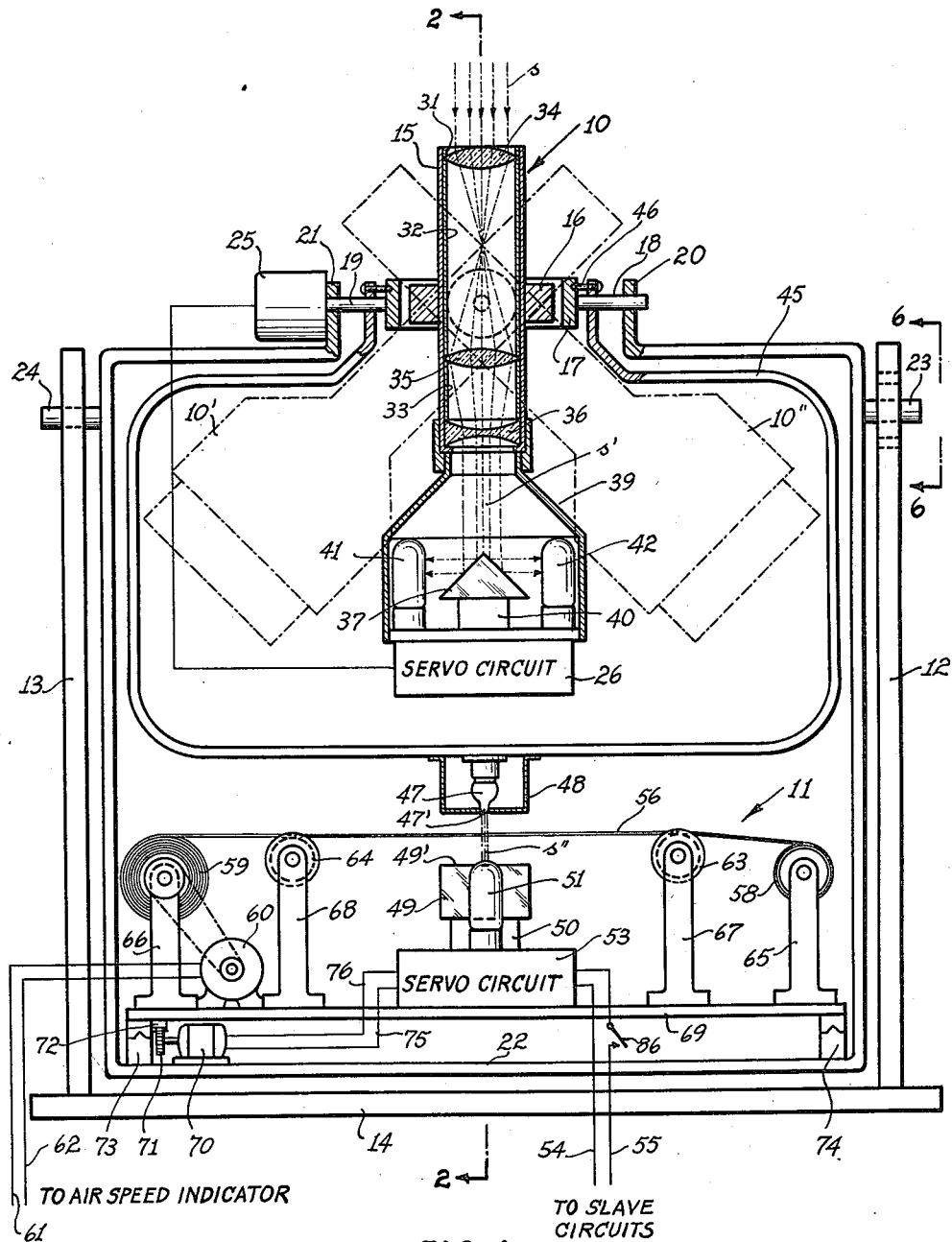
Fig. 1 is a front elevation of a navigation device according to the invention.
Figure 2:
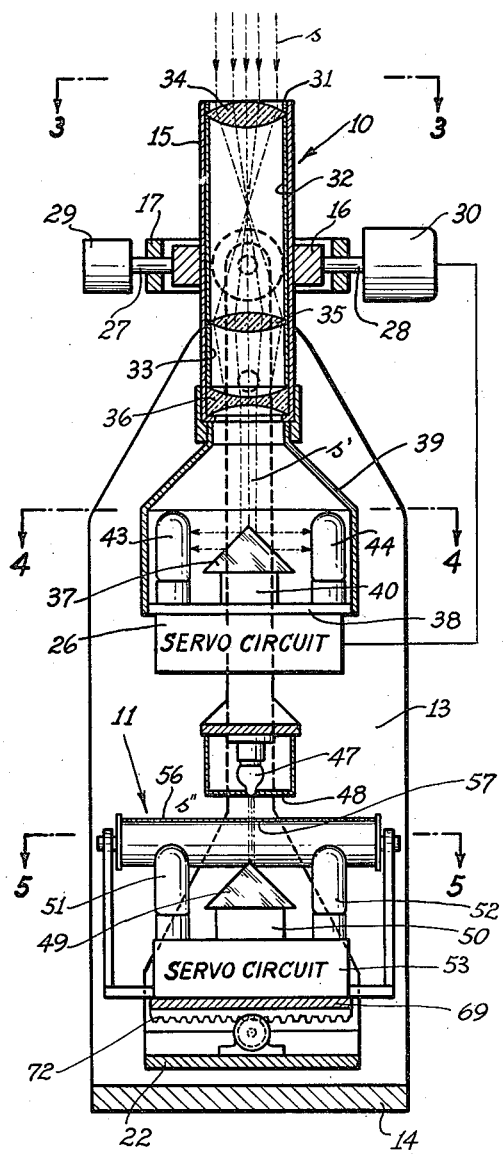
Fig. 2 is a side elevation taken on the line 2—2 of Fig. 1.
Figure 7:
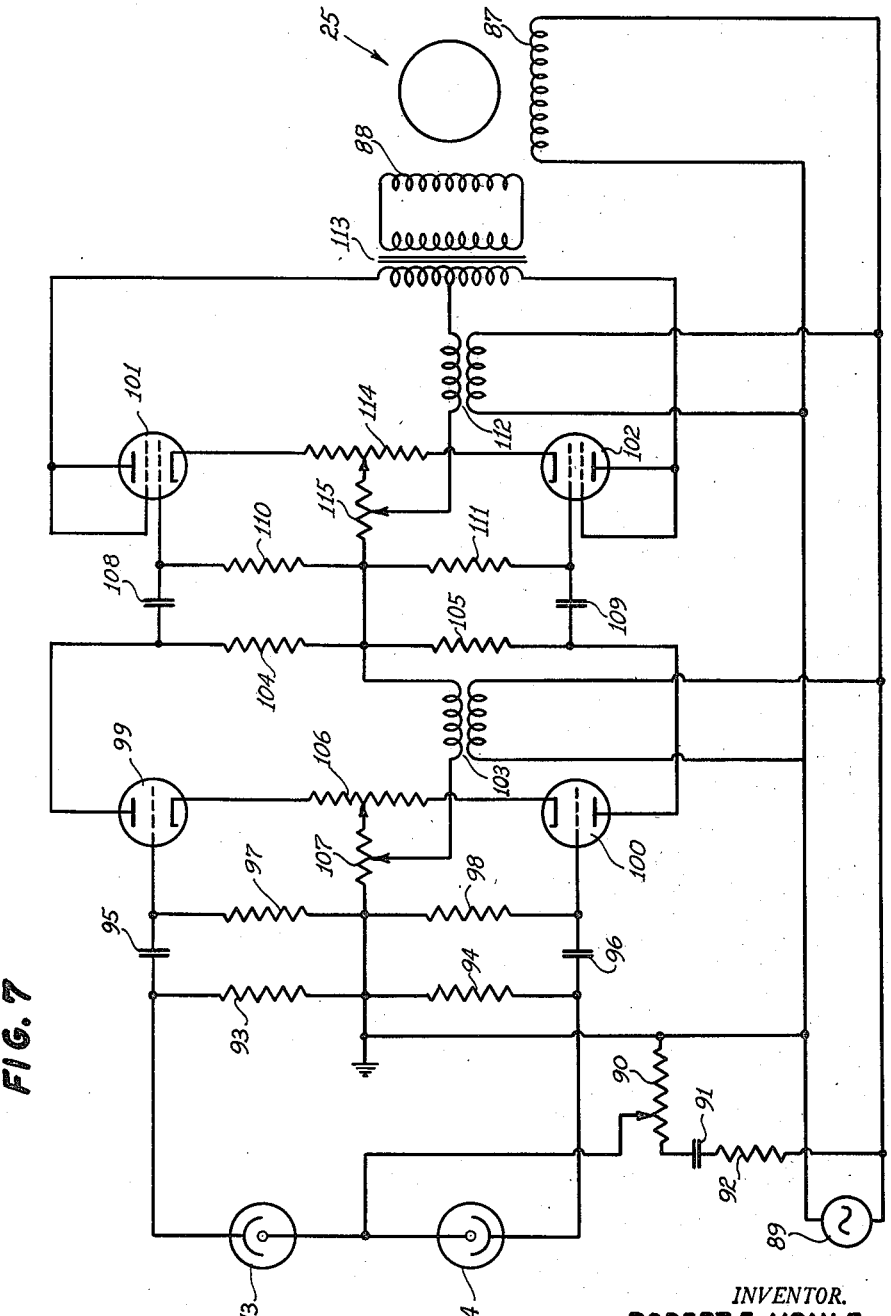

Figs. 3, 4 and 5 are sectional views taken on the lines 3—3, 4—4 and 5—5, respectively, of Fig. 2;

Fig. 6 is a fragmentary side view taken on the line 6—6 of Fig. 1;

Fig. 7 is a circuit diagram showing one of the servo circuits used in the device illustrated in Figs. 1 and 2; and Figs. 8 and 9 illustrate diagrammatically the plotting of a course in accordance with the invention.

Referring first to Figs. 8 and 9, there is shown at E the earth on which two points A and B are interconnected by an arc $a$ of a great circle $c$. It is assumed that an aircraft or missile M, flying from A to B, is to proceed a predetermined distance $h$ above the surface of the earth E, this course being indicated at $p$ and being for the major part a great circle of radius $r+h$ wherein $r$ is the radius of the earth. By V is designated a vertical plane which passes through points A, B and through the center O of the earth, and within said plane the path $p$ must lie. The intersection $t$ of the planes H and V is tangential to the arc $p$ and determines the true azimuth to be followed by the craft, any deviation from which should bring into play compensatory forces which will be effective to realign the craft with its predetermined course.

The light rays received from the celestial body or star S at a particular point P of the route are indicated at $s$ and, together with the direction of flight of the craft (which should coincide with line $t$), define a further plane Z which encloses an angle $\theta$ with the vertical plane V, the value of this angle varying continuously as a function of time owing to both the diurnal motion of the star S and the displacement of the craft M along the path $p$. (Only in very exceptional cases will the variation of this angle be small or zero, yet it will always be possible to select a suitable celestial body giving sufficiently large variations to insure adequate control.)

It will now be understood that, if the craft M veers from its course so that the line $t$ is no longer tangential to the predetermined path $p$, the angle $\theta$ will assume a value different from that precalculated for the particular time and place, being greater or less according to the deviation from the true azimuth is in one direction or the other. It will also be understood that, in order to make the value of $\theta$ a function of time alone, the relationship between time and location must be known, i.e. the speed of the missile must have been included in the calculation. Accordingly, it becomes necessary either to maintain the speed of the missile at a prescribed (preferably constant) value, or to determine the actual speed and modify the calculated values of $\theta$ accordingly. How this may be accomplished automatically will be subsequently described.

Referring to Figs. 1 through 5, there is shown a navigation device according to the invention comprising, essentially, a stellar compass 10 and a control mechanism 11, both supported (as more fully outlined hereinafter) on standards 12, 13 which rise from a platform 14. The platform 14 is fixed directly to the frame of the suitably stabilized missile or craft (not shown).

The stellar compass comprises a tube 15 mounted on the inner one, 16, of two gimbal rings 16, 17. The outer ring 17 is mounted on two shafts 18, 19 journaled in the upper extremities 20, 21 of a substantially U-shaped frame 22 which in turn is pivotally suspended from the standards 12, 13 by means of pins 23, 24. The shaft 19 supports, cantilever fashion, a servo motor 25 controlled, in a manner subsequently described, from a servo circuit 26. The inner ring 16 is mounted on two shafts 27, 28 journaled in the outer ring 17, shaft 27 supporting a counterweight 29 for a second servo motor 30 which is carried, cantilever fashion, on the shaft 28 and is also controlled from the servo circuit 26.

Mounted inside the tube 15, as by means of bushings 31, 32, 33, is an optical system for converting the rays $s$ from celestial body S (Fig. 9) into a suitable beam of preferably parallel rays $s'$, this system including two converging lenses 34, 35 and a diverging lens 36. The rays $s'$ impinge upon a pyramidal prism 37 which is supported on the bottom 38 of a bottle-shaped holder 39 forming a continuation of tube 15, the tube and the holder being joined together by means of a collar. It will be noted that the elements of the servo circuit 26 are mounted on the bottom 38 exteriorly of the holder 39. The support for the prism or deflecting element 37 is indicated at 40.

The element 37 directs the light rays $s'$ from the tube 15 upon four photocells 41, 42, 43 and 44 whose disposition is best seen in Fig. 4. Normally, i.e. when the tube 15 is centered with respect to the prism 37, light will fall on all four photocells in a uniform manner. One pair of opposite photocells, viz. the cells 41 and 42, are connected to the servo circuit 26 in such manner that the motor 30 will be energized when an unbalance current, resulting from unequal illumination of these cells, is produced thereby; similarly, the cells 43 and 44 control the motor 25 so that the motor will respond to unequal illumination of the latter pair of cells. The motors are connected to the servo circuit 26 in such a way that, should one or both pairs of photocells become unbalanced as a result of a disalignment of the tube 15 with respect to the rays $s$, these motors will operate to displace the telescope 15 in such a direction that the rays $s'$ will once more impinge centrally upon the prism 37.

A second frame 45, suspended from the shafts 18 and 19, is constrained by means such as pins 46 to follow the oscillations of outer gimbal ring 17 under the control of motor 25.

The frame 45 carries on its bottom a source of light 47 which, by way of a suitably apertured mask 48, casts a beam of light upon the edge of a second prism or deflecting element 49 which differs from the prism 37 by being beveled on two sides only (see Fig. 5). The support for the prism 49 is indicated at 50. Two photocells 51, 52 are disposed on opposite sides of the edge of prism 49, so that light will impinge equally upon both when the source 47 is exactly aligned with the edge of the prism. A servo circuit 53 is connected to the outputs of the cells 51, 52 and has conductors 54, 55 extending to the slave circuits (not shown) which, in a manner well known per se, govern the lateral or yaw controls of the missile.

Interposed between the lamp 47 and the prism 49 is the track 56, shown as a moving strip of film provided with a slit or transparency 57 through which the rays from source 47 may pass. The light-transmissive portion 57 extends over the full length of the track and represents a curve plotted as a function of time and the precalculated value of $\theta$. The track 56 is continuously unwound from a roll 58 and wound upon a roll 59 by means of a motor 60 which, in the arrangement illustrated, is controlled from a conventional air speed indicator (not shown) over leads 61, 62. The rolls 58, 59 as well as a pair of idler rollers 63, 64 are supported, by means of mounts 65, 66, 67 and 68, respectively, upon a platform 69 which also carries the elements of servo circuit 53 and in turn rests on the horizontal bottom member of frame 22.

The operation of the device so far described will now be explained:

From what has been said before it will be readily understood that the servo circuit 26 will have the tendency, by means of motors 25, 30, to keep the telescope 15 of the stellar compass constantly trained upon the selected celestial body S. We shall assume, for the moment, that the source 47 is mounted directly upon the bottom of holder 39 which is fixed to the tube 15, so that the rays $s''$ of this source will effectively form a continuation of the rays $s$ received by the telescope. As long as these rays are trained upon the ridge 49' of the prism 49, this edge together with the rays $s''$ will define a plane whose angle with the vertical will vary as a function of $\theta$. The direction of the rays $s''$ is, however, determined by two points, one being the pinpoint end 47' of source 47 and the other being the center of the track portion 57 which at that moment is between the photocells 51, 52. As the track 56 is displaced, the position of the track portion 57 relative to the ridge 49' varies; thus the position of the pinpoint 47' must vary accordingly in order to continue the impingement of the rays $s''$ upon the ridge 49'. If, now, the rays $s''$ are deflected so that more light will fall upon one of the cells 51, 52 than upon the other, servo circuit 53 will act upon the slave circuits of the craft to alter its course until correct positioning of the source 47 is again obtained.

I have found, however, that it is generally desirable to have the source 47 execute no movement in the direction of movement of the track 56, and the arrangement shown is designed to make the system independent of the displacement of the telescope in this direction. For this purpose it is assumed that the missile moves in the direction perpendicular to the paper as viewed in Fig. 2, the movement of the track 56 being therefore parallel to the travel of the missile. As shown in Fig. 1, the telescope 10 may swing freely in the plane of travel (the plane V of Fig. 9) without entraining the lamp 47 (see point-dotted outlines 10' and 10''), but any movement transverse thereto, occurring under the control of motor 25, will be communicated to the frame 45 and, thereby, to the source of light 47.

While the arrangement described above will tend to restore the correct azimuth after a deviation has occurred, this in itself will not be always sufficient to maintain the craft on the charted course if, for some reason, the craft has a greater inherent tendency to deviate to one side than to the other. Such deviations may result, for example, from the well-known Coriolis effect, an acceleration due mainly to the rotation of the earth. In order substantially to neutralize the cumulative effect of these deviations, I provide special means which, as shown in Figs. 1 and 2, comprise an auxiliary motor 70 driving a pinion 71 which meshes with a rack 72 secured to the platform 69. The platform itself is slidably supported on rails 73, 74 so as to be movable in a direction transverse to the movement of the track 56. The motor 70 is controlled from the servo circuit 53, by way of leads 75, 76, in such manner that any unbalance of the photocells 51, 52 will tend to increase the disalignment of the rays $s''$ with respect to the edge 49', thereby causing the slave circuits controlled over leads 54, 55 to overshoot the mark so that the missile will hunt in slow oscillations about its prescribed course.

As stated above, means may be provided for maintaining the device inoperative until the missile reaches the drop-off point D (Fig. 8) where the level flight begins. Such means may, for example, taken the form of a magnetic locking device as shown in Fig. 6. Here the standard 12 is shown as provided with an insert 77, of insulating material, which houses an electromagnetic coil 78 and is provided with a circular cutout 79 wherein a wheel 80, fixed to the shaft 23, is rotatably journaled. Wheel 80 carries a magnetic armature member 81 connected to ground by way of a conductor 82 and a relay 83. The coil 78 is connected by way of a conductor 84 to grounded battery 85. The coil 78 is wound around and conductively connected to a core 186 which, in the position of the wheel 80 shown in Fig. 6, makes contact with the armature 81 and closes a circuit for the relay 83, at the same time energizing the coil 78 and immobilizing member 81 along with shaft 23.

The position shown in Figs. 1, 2 and 6 is the one which the frame 22 will assume by virtue of gravity whenever the craft or missile is in level flight; during launching, on the other hand, the position of the frame 22 will be perpendicular to that shown and relay 83 will be deenergized. When the circuit is closed, the relay 83 may cause the closure of a switch such as 86 (Fig. 1) to place the slave circuits of the craft under the control of the servo circuit 53.

As an alternative arrangement, the switch 86 may also be controlled from a device such as a conventional accelerometer (not shown) which operates when vertical motion of the missile has ceased.

The operation of the servo circuit 26 is illustrated in Fig. 7 which, however, shows only the control of motor 25 by photocells 43, 44, it being understood that the other pair of photocells control the motor 30 in identical manner.

The motor 25 has two windings indicated at 87 and 88, respectively. Winding 87 is connected directly across a source of alternating current 89; a portion of the output of this source being tapped off by means of a potentiometer 90 connected across the terminals of generator 89 is series with a condenser 91 and a resistor 92. One terminal of potentiometer 90 is grounded and its slider is connected to the anodes of the two photocells 43, 44 in parallel. The cathodes of these photocells are grounded over respective output resistors 93, 94 across which a positive pulse is developed during alternate half cycles of the generator 89. These pulses are applied, over coupling condensers 95, 96 and grid leak resistors 97, 98, respectively, to the grids of vacuum tubes 99, 100 which are the first stage of a push-pull amplifier whose second stage are the two tetrodes 101, 102. The plates of tubes 99, 100 are energized from the source 89 by way of a transformer 103 and respective anode resistors 104, 105, the cathodes of these tubes being grounded over a balancing potentiometer 106 and a resistor 107 to whose variable tap the secondary of transformer 103 is connected. Blocking condensers 108, 109 and grid leak resistors 110, 111 couple the plates of triodes 99, 100 to the grids of tetrodes 101, 102, respectively. The plates of tubes 101, 102 are energized from the generator 89 by way of a transformer 112 and respective halves of the primary of an output transformer 113 across the secondary of which the field winding 88 is connected. The cathodes of tubes 101, 102 are grounded over a balancing potentiometer 114 and a resistor 115 to whose variable tap the secondary of transformer 112 is connected.

It will be seen that, when the photocells 43 and 44 are equally illuminated, the pulses applied to the push-pull amplifier 99—102 by both cells will be of uniform amplitude and will give rise, in the secondary of output transformer 113, to a roughly sinusoidal wave of double the frequency of generator 89. The effect of this wave will merely be to vibrate the motor shaft without displacing it to any appreciable extent. If, however, the excitation of the cells varies, then one or the other set of pulses predominates, thus effectively superimposing upon the aforementioned wave a wave at the frequency of generator 89 but suitably phase displaced relative thereto to cause the motor to rotate until the outputs of the two cells are again in balance. The necessary phase displacement is, of course, obtained by properly dimensioning the various coupling circuits of the amplifier.

The principle of operation of the servo circuit 53 is the same as that illustrated in Fig. 7, with the cells 51, 52 replacing the cells 43, 44 and a control-actuating servo motor (not shown) taking the place of motor 25.

When the motor 60 is connected to an air speed indicator as illustrated in Fig. 1, the function of this indicator will be to vary the speed of the motor so that the portion of track fed into the control circuit 47—53 will correspond to the section of its route actually traversed by the missile. The air speed indicator or some other form of governor may also be used to maintain the speed of the craft constant, in a manner known per se, in which case the speed of the motor 60 may also be constant; additional synchronization may, however, be provided by means of time signals received aboard the craft, these signals being then compared, for example, with special markings on the track 56 so as to detect and compensate for any lag or lead of the track with reference to its calculated run.

Finally, it will be possible to employ the same stellar compass 10, in combination with a second robot circuit or "range" control mechanism as distinct from the "azimuth" mechanism, for controlling the speed of the missile by letting a source of light illuminate a pair of photocells such as 51, 52 by way of a simulated track which is calculated not with respect to the angle $\theta$ but, for example, with respect to the instantaneous angle which a vertical plane through S and P (Fig. 9) encloses with the plane V; such an arrangement may conveniently utilize a source of light entrained by the inner gimbal ring 16 in the same manner in which the lamp 47 is entrained by the outer ring 17, with the track of the associated control circuit running at right angles to the track 56. This control circuit has not been illustrated because it will be identical with the control circuit 11 of Figs. 1 and 2, except that its servo circuit (corresponding to servo circuit 53) will control the speed rather than the direction of the craft. With selection of a suitable celestial body, the value of the reference angle may be made to vary considerably throughout the journey, thus affording an accurate determination of the instantaneous position of the craft and permitting the necessary corrections to be made. It will, of course, be possible to utilize two different stellar compasses and two celestial bodies for purposes of range and azimuth control, respectively. The servo circuit controlled by the range track may also be used to modify the speed of the motor 60 of the azimuth track rather than the speed of the craft itself.

It will be understood that the foregoing description is merely illustrative of the many possibilities of utilizing my invention and its obvious modifications and adaptations, and that numerous changes may be made by persons skilled in the art without departing from its spirit and exceeding its scope as defined in the objects and in the appended claims.

I claim:

1. In a navigation device for guiding a craft, in combination, a stellar compass, a source of light entrainable by said compass, control means responsive to light from said source, robot means for automatically maneuvering the craft, said control means being adapted to modify the operation of said robot means according to the manner in which said light strikes said control means, and means including a simulated track for continuously deflecting the light of said source so that, as long as the movements of said source are compensated by said deflecting means, said control means will remain inoperative.

2. A navigation device for guiding a craft, comprising a stellar compass, a source of light entrainable by said compass, control means responsive to light from said source, robot means for automatically maneuvering the craft, said control means being adapted to modify the operation of said robot means according to the manner in which said light strikes said control means, track means interposed between said source and said control means, said track means comprising a substantially non-transparent member containing a narrow transparency, and drive means for continuously feeding said transparency, past said source so that, as long as the movements of said source are compensated by shifts in said transparency, said control means will remain inoperative.

3. A navigation device according to claim 2, further comprising speed control means for synchronizing the speed of said drive means with that of the craft.

4. A navigation device according to claim 3 wherein said speed control means comprises an air speed indicator.

5. In combination, a pair of navigation devices according to claim 2, the first of said devices being adapted to control the direction of the craft, the second of said devices being adapted to synchronize the speed of the said drive means of the first device with the speed of the craft.

6. The combination according to claim 5 wherein two said devices include a common stellar compass.

7. A navigation device for guiding a craft, comprising a stellar compass, a source of light entrainable by said compass, control means responsive to light from said source, robot means for automatically controlling the direction of the craft, said control means being adapted to modify the operation of said robot means according to the manner in which said light strikes said control means, an elongated track member interposed between said source and said control means, said track member being substantially non-transparent except for a narrow light-transmissive portion extending substantially the full length thereof, and drive means for continuously feeding said track member past said source at a speed related to that of the craft so that, as long as the movements of said source are compensated by shifts in said light-transmissive portion, said control means will remain inoperative.

8. A navigation device according to claim 7 wherein said stellar compass comprises a telescope, first mounting means adapted to support said telescope for swinging movement in the direction of travel of said track, second mounting means adapted to support said telescope for swinging movement in a direction perpendicular to said direction of travel, photosensitive means adapted to be illuminated by light from a celestial body passing through said telescope, and electric circuit means under the control of said photosensitive means for keeping said telescope trained upon said body, said source of light being entrainable by said second mounting means for displacement in said perpendicular direction only.

9. A navigation device according to claim 8 wherein the direction of travel of said track is parallel to that of said craft.

10. A navigation device for guiding a craft, comprising a stellar compass, a simulated track, robot means adapted to maneuver the craft, track follower means adapted to control said robot means in response to changes in the relative position of said compass and said track, and drive means independent of said stellar compass for feeding said track continuously past said compass and said follower means, said track follower means comprising an optical scanning system, said track comprising an opaque member provided with a light-transmissive portion extending substantially in the direction of feed, said scanning system having a stationary part fixed to said craft and a movable part entrainable by said compass, said member passing between said two parts.

11. A navigation device according to claim 10 wherein said movable part comprises a source of light and said stationary part comprises a plurality of photosensitive elements and a light-deflecting element adapted to throw light from said source equally upon said photosensitive elements when said light-transmissive portion and said source are in certain relative positions.

12. A navigation device for guiding a craft, comprising a stellar compass, a simulated track, robot means adapted to determine the direction of said craft, track follower means adapted to control said robot means in response to changes in the relative position of said compass and said track, drive means for feeding said track continuously past said compass and said follower means, and switch means for rendering said follower means effective at a predetermined point in the journey of the craft, said switch means comprising an accelerometer adapted to operate when vertical movement of the craft ceases.

13. A navigation device for guiding a craft, comprising a stellar compass, a simulated track, robot means adapted to determine the direction of said craft, track follower means adapted to control said robot means in response to changes in the relative position of said compass and said track, drive means for feeding said track continuously past said compass and said follower means, switch means for rendering said follower means effective at a predetermined point in the journey of the craft, pivotal mounting means for said follower means, said mounting means being adapted to assume a predetermined position when the craft is in level flight, and switch-actuating means adapted to operate said switch means when said mounting means assumes said predetermined position.

14. A navigation device according to claim 13, further comprising electromagnetic locking means operable simultaneously with said switch-actuating means for maintaining said mounting means in said predetermined position.

15. In a navigation device for guiding a craft, the combination, with a stellar compass and control means adapted to maneuver the craft, of a pinpoint source of light, entrainable by said compass, photosensitive means responsive to light from said source for actuating said control means, screen means having a light-transmissive portion positioned intermediate said source and said photosensitive means, and mechanism independent of said stellar compass for displacing said screen means according to a predetermined law.

16. A navigating apparatus for craft comprising a chart having a course of non-critical shape to a destination plotted thereon, an angularly movable electronic device activated by radiant energy from a celestial body, electrically operated mechanism controlled by the activation which automatically moves the device angularly to maintain a celestial fix on said body, craft guidance apparatus, a course follower which is movable relative to the charted course, means controlled by angular movement of said device which moves the follower relative to the chart to a position which corresponds with the instantaneous craft position, and mechanism controlled by a deviation of the follower from the plotted course which governs the craft guidance apparatus so as to decrease that deviation.

References Cited in the file of this patent

UNITED STATES PATENTS

| | | |
|---|---|---|
| 2,155,402 | Clark | Apr. 25, 1939 |
| 2,341,287 | Pookhir et al. | Feb. 8, 1944 |
| 2,363,363 | Rubissow | Nov. 21, 1944 |
| 2,424,193 | Rost et al. | July 15, 1947 |
| 2,444,933 | Jasperson | July 13, 1948 |
| 2,462,925 | Varian | Mar. 1, 1949 |
| 2,492,148 | Herbold | Dec. 27, 1949 |
| 2,532,402 | Herbold | Dec. 5, 1950 |